Figure 4:
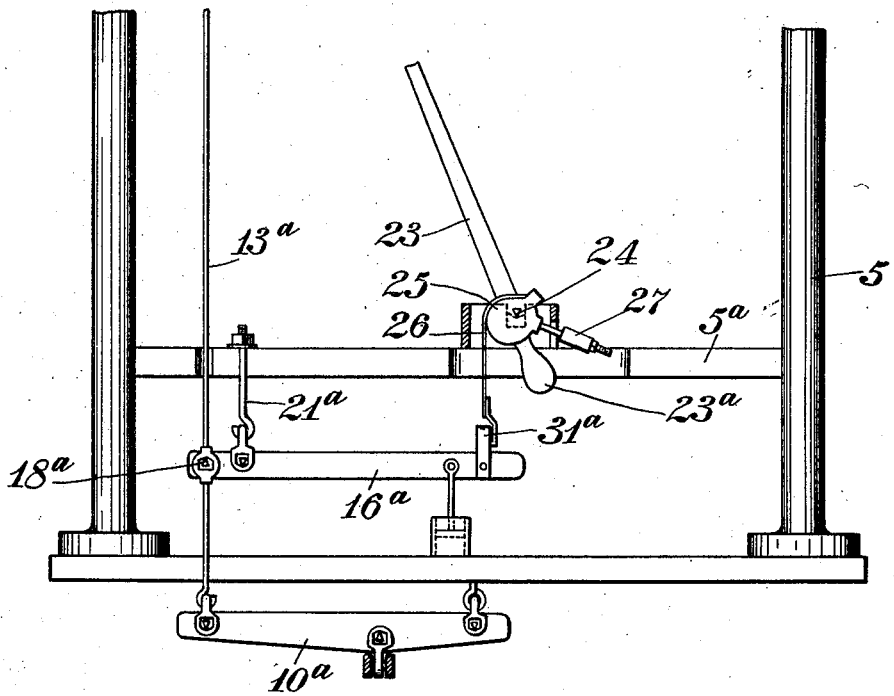

B. M. BROOKE.
WEIGHING SCALE.
APPLICATION FILED SEPT. 20, 1913.
1,144,687.
Patented June 29, 1915.
2 SHEETS—SHEET 1.
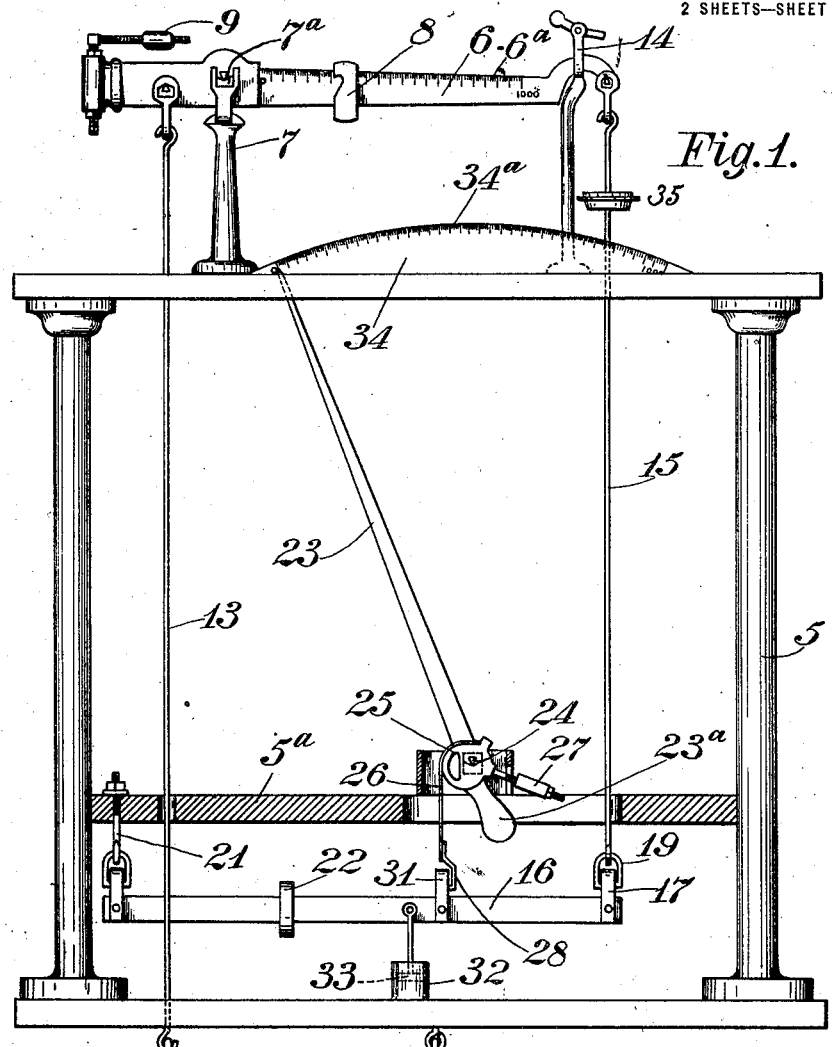
Fig. 1.
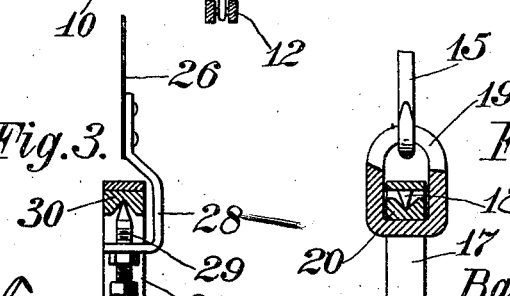
Fig. 3.
Fig. 2.
Witnesses
Benjamin Finckel
E. Loewensohn
Inventor
Banner M. Brooke
by Finckel Finckel
his Attorneys

UNITED STATES PATENT OFFICE.

BANNER M. BROOKE, OF COLUMBUS, OHIO.

WEIGHING-SCALE.

1,144,687.  Specification of Letters Patent.  Patented June 29, 1915.

Application filed September 20, 1913. Serial No. 790,833.

*To all whom it may concern:*

Be it known that I, BANNER M. BROOKE, citizen of the United States, residing at Columbus, in the county of Franklin and State of Ohio, have invented a certain new and useful Improvement in Weighing-Scales, of which the following is a specification.

The invention relates more especially to what are called quick indicating scales and has for its object to provide an improved and simplified construction dispensing with racks, pinions, springs and parts greatly subject to deterioration and also in which friction and the possibility of the generation of friction by foreign obstructions is reduced to a minimum.

The invention is embodied in the examples herein particularly shown and described and then pointed out in the claim.

Figure 1 is a general view of the front of the apparatus, parts being in elevation and parts in section. Fig. 2 is a detail of a bearing used in the pendent weight beam. Fig. 3 is a detail of a bearing between the pendent weight beam and the indicator. Fig. 4 is a view like Fig. 1 but omitting the upper portion of the structure to illustrate a modification.

In the views 5 designates the frame of an ordinary platform scale which is equipped for the application of my invention with a horizontal cross piece 5ª.

Referring more particularly to the construction shown in Fig. 1, the character 6 designates the scale beam fulcrumed as usual on a pair of agate bearings like that at 7ª in the beam hanger 7 and having a sliding poise 8 as well as an adjustable balance ball 9. The scale beam has any suitable scale 6ª. The character 10 designates a shelf lever loosely hung at 11 to and under the lower member of the frame. Connected with said shelf lever 10 is the usual steelyard rod 12 of the platform (not shown); and connecting the free end of said shelf lever with the shank of the scale beam 6 is the beam rod 13. The end of the long arm of the scale beam oscillates in a trig loop 14. The end of the scale beam beyond the loop 14 has loosely connected to it a counter poise stem 15 that extends through an opening in the frame member 5ª to the pendent weight beam 16. The said pendent weight beam is provided at one end with a loop 17 containing a pin pivot 18; and the stem 15 is provided with a stirrup 19 having a socket bearing 20 to receive the pin pivot 18 as shown in Figs. 1 and 2. The other end of the pendent weight beam is hung upon a hanger 21 secured in the frame member 5ª, the connection between the hanger and the pendent weight beam being like that shown in Fig. 2. The pendent weight beam contains a sliding balance weight 22.

23 designates an oscillating indicator arm supported upon a knife edge fulcrum 24. The indicator arm is balanced by a weight 23ª on the opposite side of the fulcrum 24. A suitable eccentric member 25 on the axis of the indicator has connected with it a flexible metallic strap 26 that rides on the rim of the eccentric. The indicator arm is also provided with a suitable adjustable pendulum weight 27. The strap 26 has connected to it, at its lower end, a hook member 28 provided with an adjustable pin pivot 29 engaging a socket bearing 30 on a loop 31 on the pendent weight beam.

32 designates a dash pot containing a suitable liquid in which works a plunger 33 connected with the pendent weight beam, said liquid being adapted to retard the oscillation of the parts.

34 designates a dial having a suitable scale 34ª arranged on an arc concentric with the path of the indicator arm 23.

The weight beam 6, its necessary appurtenances and its operating mechanism, may be said to be the primary weighing mechanism.

The scales 6ª and 34ª should be appropriately marked to indicate, say pounds, a thousand pounds "by fives" on each scale for example. If in the instance described the scale beam be at balance or indicating zero and one thousand pounds be placed upon the platform of the scale it will release sufficient weight from the gravity lever to allow the pendulum to descend automatically exactly sufficient to bring the indicator a thousand pounds on the dial, and if any fraction of said weight be placed upon the platform the weight thereof will likewise be indicated at the proper point on the dial. The total weight of any load imposed upon the platform, and within the weighing capacity of the scale, is indicated by the sum of the weights indicated by the two scales, such weight being quickly ascertained by reason of the quick oscillation of the indicator to a condition of rest at the proper mark on the dial. It is, of course, the oscillation of the scale beam to a position above its depressed position that permits the pendulum indicator to move to the point indicating the weight of the load. Loads the weighing of which are beyond the full capacity of the apparatus can be weighed by adding counter-poise weights to the shelf 35 of the counter-poise stem or as, for instance, as shown and described in my Letters Patent of the United States, No. 1,009,826, dated November 28, 1911.

In the construction shown in Fig. 4 the counter-poise stem 15 (of Fig. 1) is not connected with the pendent weight beam 16; but instead a beam 16ª is fulcrumed on a hanger 21ª and said beam is actuated by a modified beam rod 13ª connected with the shank of the scale beam and shelf lever 10ª, said beam rod 13ª engaging a bearing 18ª on said beam 16ª. In this modified construction the indicator 23 is, in the weighing operation, released by the depression of the beam rod 13ª thereby elevating the loop 31ª. In other particulars the construction can, if desired, be substantially the same as that illustrated in Fig. 1.

Among other advantages of my construction it will be observed that it is less liable than others to injury by violent loading of the platform. The construction is also susceptible of other modification without departing from the gist of my invention as claimed.

What I claim is:

The combination with a platform scale including a scale beam and a counterpoise, of a pendulum indicator and scale stem, of a pendent weight beam connected with the counterpoise stem and with the pendulum indicator to actuate the latter, substantially as described.

BANNER M. BROOKE.

Witnesses:
GEORGE M. FRANCIS,
BENJAMIN FINCKEL.